(12) United States Patent
Schwaiger et al.

(10) Patent No.: US 6,294,044 B1
(45) Date of Patent: Sep. 25, 2001

(54) APPARATUS FOR THE PRODUCTION OF WINDOW FRAMES

(75) Inventors: Meinhard Schwaiger, Linz; Karl Mock, Ulrich/Steyr, both of (AT)

(73) Assignee: Technoplast Kunststofftechnik GmbH, Micheldorf (AT)

(*) Notice: Subject to any disclaimer, the term of this patent is extended or adjusted under 35 U.S.C. 154(b) by 0 days.

(21) Appl. No.: 09/218,051

(22) Filed: Dec. 22, 1998

(30) Foreign Application Priority Data

Dec. 22, 1997 (AT) .................................................. 807/97 U

(51) Int. Cl.⁷ .................................................. B29C 65/20
(52) U.S. Cl. .................................... 156/304.2; 156/304.6; 156/557; 156/559; 156/583.1
(58) Field of Search .................................... 156/557, 559, 156/304.2, 304.6, 580, 583.1, 538, 539; 269/41

(56) References Cited

U.S. PATENT DOCUMENTS

| | | | |
|---|---|---|---|
| 4,909,892 | * | 3/1990 | Quinn et al. ........................... 156/499 |
| 5,006,198 | * | 4/1991 | Pasquini ............................... 156/559 |
| 5,736,000 | * | 4/1998 | Sturtz ................................. 156/499 |
| 6,086,703 | * | 7/2000 | Sturtz ................................. 156/267 |

FOREIGN PATENT DOCUMENTS

| | | |
|---|---|---|
| 23 54 233 | 5/1975 | (DE) . |
| 3721 861 | 1/1989 | (DE) . |
| 3831 471 | 3/1990 | (DE) . |

OTHER PUBLICATIONS

Derwent Abstact of DE 3721861 A1, Jan. 12, 1989.*
Derwent Abstact of DE 2354233 A, May 15, 1975.*
Derwent Abstact of DE 3831471 A1, MAr. 22, 1990.*

* cited by examiner

*Primary Examiner*—Richard Crispino
*Assistant Examiner*—Sue A. Purvis
(74) *Attorney, Agent, or Firm*—Dykema Gossett PLLC

(57) ABSTRACT

The present invention relates to an apparatus for the production of window frames made of profile sections with a joining device in which the profile sections are joined into window frames and with a conveying device for the supply of profile sections to the joining device. A substantially automated production is achieved in such a way that the joining device is in connection with an insertion device which is provided upstream with at least one turning device in order to turn the profile sections into the respective position and that the insertion device is arranged so as to convey the profile sections to an insertion position on the joining device in a configuration corresponding to the completed window frame.

21 Claims, 3 Drawing Sheets

APPARATUS FOR THE PRODUCTION OF WINDOW FRAMES

BACKGROUND OF THE INVENTION

The present invention relates to an apparatus for producing window frames from profile sections, with a joining device in which the profiles are joined into window frames and with a conveying device for supplying the profile sections to the joining device.

Window frames are merely produced in an automated manner from respective profiles. Within the terms of the present invention the term "window frame" shall mean both the generally movable arranged component which carries the window pane so as to form a wing of a window as well as the component fixedly arranged in the building in which one or several wings of windows are arranged. In the case of plastic windows, the joining device is arranged as a welding machine which at first heats the ends of the profile section which are cut to mitre and then presses them against one another in order to bring about a fixed connection. Metal windows can be produced in such a way that a respective connection part made of plastic or the like is introduced into the hollow spaces of the metal profiles at the ends cut to mitre, whereupon a predetermined zone of the metal profile is plastically deformed by a die in order to ensure a secure connection to the metal profile sections with the fixing parts.

The insertion of the profile sections into the respective joining device is generally made manually. The profile sections that belong to one another are conveyed into the vicinity of the joining device, whereupon an operator performs the insertion process. As a result of high need for staff, this procedure is expensive and very inefficient. As an alternative, it is possible to have the insertion of the profile sections into the joining device performed by a machine, namely by a buckling arm robot. However, the cycle time of modern joining devices is so short that it is not possible for such a rotor to insert four profile sections in the available time. That is why the robot becomes a capacity-limiting component.

DESCRIPTION OF PRIOR ART

From DE 37 21 861 A a method and apparatus for the production of a rectangular frame, in particular a window frame, has become known. In this method the plastic profile pieces which are cut to size are deposited into an intermediate storage for each frame so as to be taken from there individually by a gripper movable in three planes and so be deposited successively in the welding machine. In respect of magnitude, the duration of the insertion process corresponds to that of the actual welding process, i.e. the welding machine is utilized in such a case only with half of its theoretically possible capacity.

From DE 38 31 471 A a method for the production of plastic windows is known in which a capacity increase is achieved in such a way that a window frame profile and a wing profile are simultaneously extruded from a tool, cut and welded. The problem of insertion into the welding machine has also not been solved in the this known method.

An arrangement for the production of corner joints in window and door frames is also known from DE 23 54 233. The joining of the corner is substantially performed on a mounting table. The problem of an efficient insertion of the profile sections is also not mentioned here.

SUMMARY OF THE INVENTION

It is the object of the present invention to improve the aforementioned apparatus in such a way that an increase in performance can be achieved with the smallest possible expenditure.

This object is achieved in accordance with the invention in such a way that the joining device is in connection with an insertion device which is provided upstream with at least one turning device in order to turn the profile sections into the respective position and that the insertion device is arranged so as to transport the profile sections in a configuration corresponding to the completed window frame into an insertion position on the joining device.

The relevant aspect in the present invention is that the profile sections which are all conveyed in the same orientation are turned by the insertion device into the respectively required position. A turning device within the terms of the present invention is generally understood as being a component which can grip the respective profile section and turn it respectively. In accordance with the invention the individual profile sections are brought prior to the insertion to a position which corresponds principally to the completed frame. Depending on the employed joining method, there can still be spaces between the sections to be joined. For example, if the joining is performed by a four-head welding machine, the surface areas which are cut to mitre are present at a distance which allows the introduction of a welding mirror.

The present invention can be applied to different types of windows. In the production of plastic windows the joining of the profile section occurs in the known manner by welding. A pressing process is usually employed for alumina profiles. Gluing or nailing can additionally be performed for composite profiles having a wood portion.

A further increase in the cycle time can be achieved in such a way that the insertion device is provided with two turning devices which can be operated independent from one another. It is particularly favourable if one turning device is arranged for the rotation of a profile section by 180°, whereas the other turning device is arranged for turning profile sections by 90° clockwise in one direction and counterclockwise in another direction. In such an embodiment the production of the profile sections is favourably programmed in such a way that alternatingly horizontal and vertical profile sections are conveyed to the joining device. In this way the turning device is used for turning by 180° only every fourth profile section, whereas the other turning device will come into action for turning by 90° every second profile section. It is ensured in this way that the work speed of the turning device is no limiting factor for the capacity of the installation.

In an especially preferable embodiment of the invention it is provided that several feed devices are provided which each supply one or several joining devices with profile sections. In this way cycle times and production capacities of the extrusion lines can optimally be matched to one another in such a way that maximum throughput is achieved.

BRIEF DESCRIPTION OF DRAWINGS

The invention is now explained below in closer detail by reference to the embodiments shown in the drawings, in which.

DETAILED DESCRIPTION OF PREFERRED EMBODIMENTS

Figure 1:
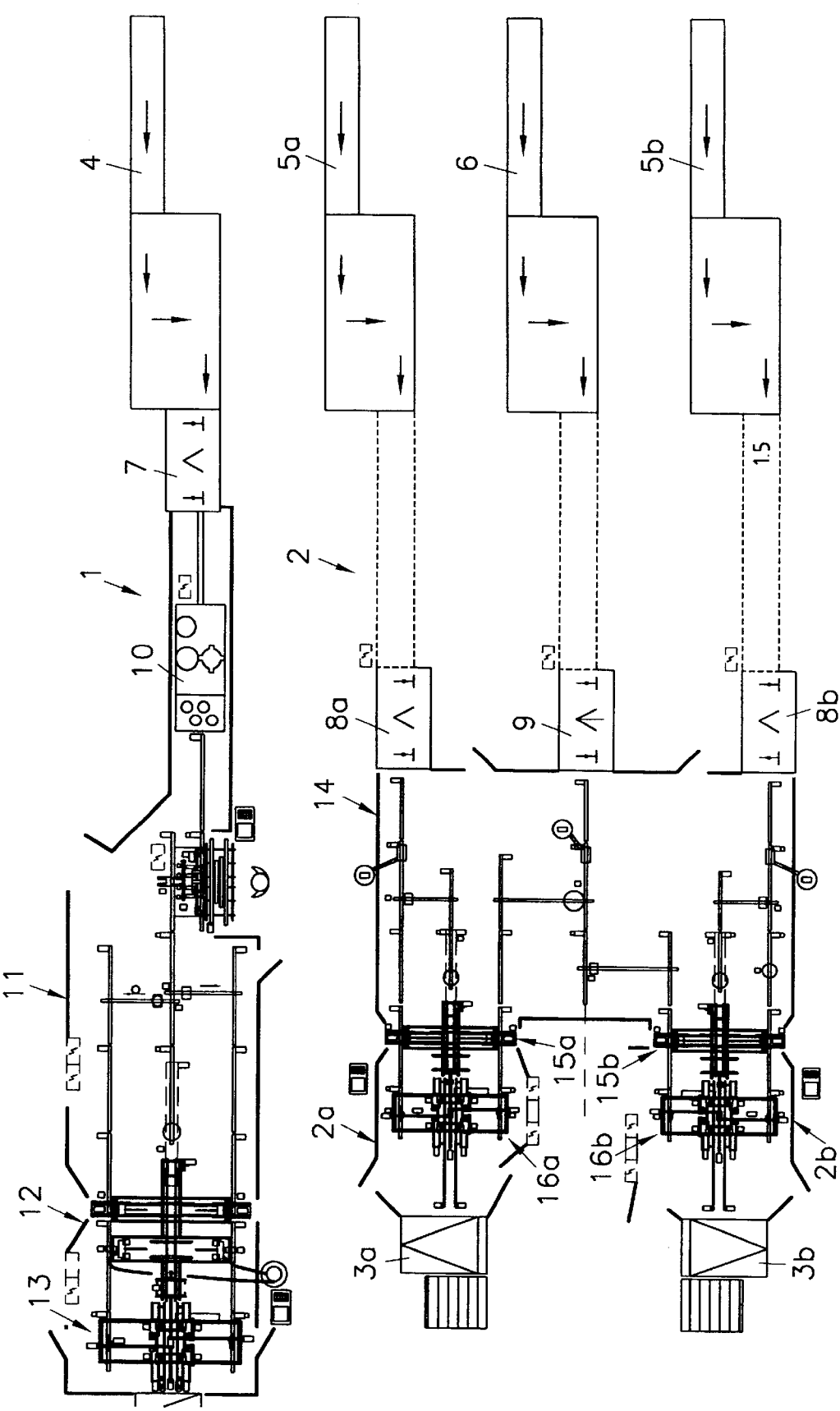
FIG. 1 shows an overview of a production line for the production of windows with apparatuses in accordance with the invention.

The production unit of FIG. 1 is provided for the production of double-wing windows. The first production line 1 is used for producing frames to be fixedly installed in buildings, whereas the product line 2, which branches at its end into lines 2a and 2b, is used for the production of window wings 3a, 3b. In an extrusion line which is generally known and is not shown herein, profile bars are produced for the frames and windows to be manufactured. A conveying device 4 for the frames, and conveying devices 5a, 5b and 6 for the wings 3a, 3b convey the bars to the mitre-box saws 7, 8a, 8b and 9. The window wings 3a, 3b are arranged in such a way that they each consist of three narrow profile sections and a wide profile section. The conveying device 6 with the mitre-box saw 9 is used for supplying the wide profile sections for both wings 3a, 3b. The conveying device 5a with the mitre-box saw 8a is used for delivering and producing the profile sections for the first window wing 3a, whereas the conveying device 5b with the mitre-box saw 8b is used for supplying and manufacturing the narrow profile sections for the second window frame 3b. A machining station 10 in the first production line 1 is used to manufacture the required bores, grooves and the like.

Figure 2:
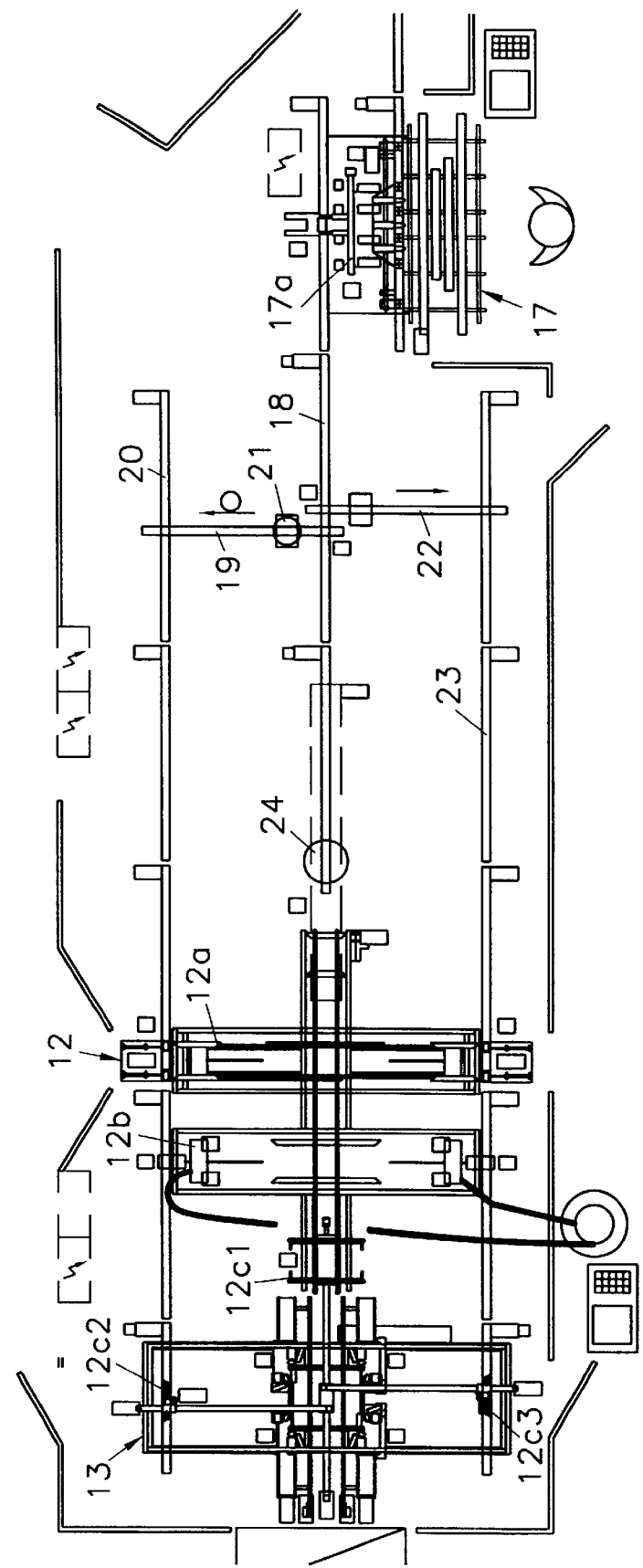
FIG. 2 shows a detail of FIG. 1 on an enlarged scale.

The actual production of the frames in the production line 1 occurs in a section which comprises a conveying device 11, an insertion device 12 which can be extended by additional mounting devices such as the additional mounting of corner connectors 12a for example, an additional device 12b for the application of sealing media or glues (e.g. for composite wood windows) consisting of the components 12c1 for the insertion of the traverse pair of bars as well as of 12c2 and 12c3 for inserting the lengthwise bars, and which is provided with a joining device 13 which is arranged as a pressing apparatus. This section of the production line 1 is shown in FIG. 2 on an enlarged scale and will be explained on the basis of this figure in closer detail. The production line 2 comprises a common conveying device 14 which is supplied with profile sections by the mitre-box saws 8a, 8b and 9. The insertion devices 15a, 15b (consisting of the mounting devices 15a1, 15b1 for the corner connectors for example and the actual insertion devices 15a2, 15bs) and joining devices 16a, 16b of the production lines 2a, 2b for the production of the window wings 3a, 3b are each provided with a separate arrangement. This section of the production line 2 is shown in detail in FIG. 3 on an enlarged scale and will be explained in closer detail in connection with this figure.

FIG. 2 shows a part of the production line 1 on an enlarged scale. A buffer storage means 17 is provided so as to enable an optimization of wastage. It is relevant for the progress of the production of the frames or wings that the individual profile sections are delivered in a precisely defined sequence. If these profile sections are cut from bars of six meters length, optimization of wastage is no longer possible. As a result of using a buffer storage means, profile sections can be produced from bars of six meters length by minimizing waste, with a resorting occurring in the buffer storage means 17 in such a way that subsequently the correct sequence is produced again. The sorting device can be extended by an additional device 17a in order to perform mounting processes on the single bar for example (such as the automated joining of aluminium and wood in wood and aluminium composite windows, the automated insertion of reinforcing profiles in PVC windows and the screwing in of the reinforcing profile). The profile sections are placed on a middle conveying path 18 and moved in a cycled manner to the left in FIG. 2. A first cross belt 19 will take over every fourth profile section in order to place the same on a second conveying path 20 which is parallel to the first conveying path 18. The cross belt 19 is equipped with a turning device 21 which turns the respective profile section by 180°. In this way the individual profile sections already have the correct orientation on the second conveying path 20 in order to form the upper part of the frame. A further cross belt 22 removes the profile sections in order to place them on a further conveying path 23 which is also parallel to the conveying path 18. A further turning device 24 is provided on the conveying path 18 downstream of the cross belts 19 and 22, which turning device turns the profile sections on the conveying path 18 alternatingly clockwise and counterclockwise. The insertion device 12 where the profiles from the conveying paths 18, 20 and 23 are supplied to thus contains all profile sections already in the correct orientation. The insertion device 12c is used to simultaneously insert, in one work pass, the four profile sections in the correct position into the joining device 13. Corner connectors are inserted into the end of the profile sections in this joining device 13 which is arranged for aluminium profiles, which connectors form the joining elements. The aluminium profiles are squashed in the joining device 13 in order to thus produce a stable and permanent connection. Such a joining device is principally known. Plastic profiles can be treated in an analog manner, with the connection being made by welding at the edges cut to mitre.

The present machine is controlled by an electronic control device in such a way that the respective first, fifth, ninth, etc. profile section is placed in one row from the cross belt 19 onto the second conveying path 20 by rotation of 180°. The third, seventh, eleventh, etc. profile section is placed by the second cross belt 22 on the further conveying path 23. The second, sixth, tenth, etc. profile section remains on the first conveying path 18 and is rotated by the second turning device 24 clockwise by 90°. The fourth, eighth, twelfth, etc. profile section also remains on the first conveying path 18 and is turned by the second turning device 24 by 90° counterclockwise. In this way it is possible to achieve high production speeds and short cycle times.

Figure 3:
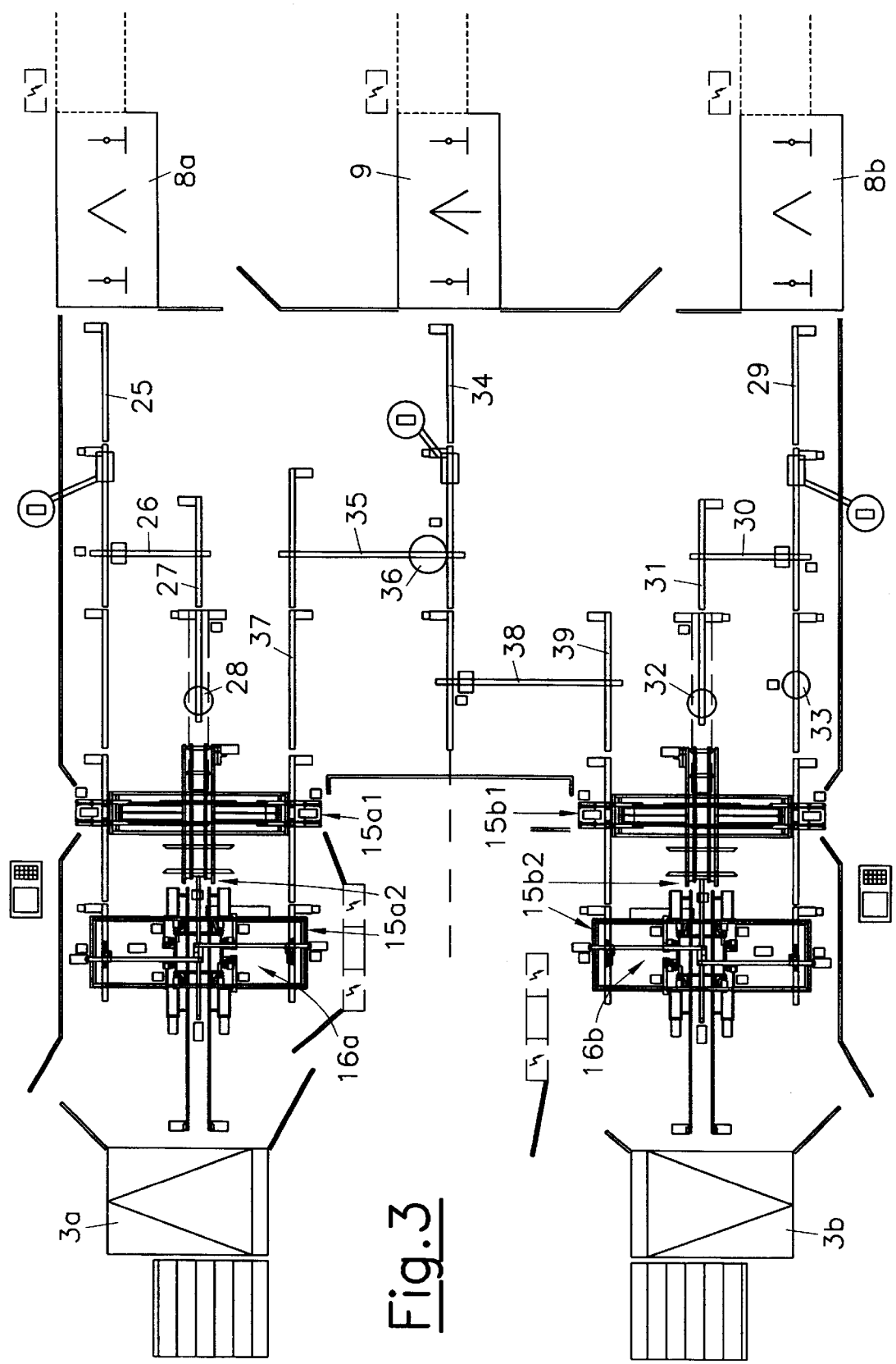
FIG. 3 shows a further detail of FIG. 1 on an enlarged scale.

FIG. 3 shows that the mitre-box saw 8a produces the upper, the left and the right profile section for the window wing 3a. The mitre-box saw 8b produces the lower, the left and the right profile section for the window wing 3b. Saw 9 is arranged as a combined mitre-box and oscillating saw in order to produce the respectively wide profile section for the two window wings 3a and 3b. A first conveying path 25 is provided for the production of the first window wing 3a from which a cross belt 26 takes profile sections in order to place them on a second conveying path 27. A first turning device 28 turns the respective profile sections by 90° clockwise or counterclockwise. Similarly, a first conveying path 29 is provided for the second window wing 3b from which a cross belt 30 takes profile sections in order to place them on a second conveying path 31 which on its part is equipped with a turning device 32. Additionally, the conveying path 29 is provided downstream of cross belt 30 with a further turning device 33 in order to turn the profile sections by 180°. The wide profile sections are supplied on a conveying path 34. A cross belt 35, which is equipped with a turning device 36, places the profile sections on a conveying path 37 for the first window wing 3a. Downstream of the same a cross belt 38 is provided in order to place the profile sections on a conveying path 39 for the second window wing 3b while maintaining the orientation of said sections. The profile sections are thus already present in the correct orientation in the insertion devices 15a, 15b. The final production of the window wings 3a, 3b is made in the joining devices 16a, 16b, as has been described above.

The arrangement of the apparatuses in this manner allows a production of windows and window frames with extremely short cycles times and substantial automation. In particular, labor-consuming manual insertion processes can be avoided.

What is claimed is:

1. An apparatus for the production of window frames made of profile sections, comprising:
    a joining device in which the profile sections are joined into window frames,
    a conveying device for supplying profile sections to an insertion device,
    the joining device is in connection with said insertion device which is provided upstream of said joining device,
    at least one turning device for turning the profile sections into the respective position, and
    the insertion device for conveying all the profile sections simultaneously to an insertion position on the joining device in a configuration corresponding to the completed window frame.

2. An apparatus according to claim 1, wherein the joining device is arranged as a welding machine for joining plastic profiles which are cut to mitre.

3. An apparatus according to claim 1, wherein the joining device is arranged as a pressing apparatus for joining aluminium profiles.

4. An apparatus according to claim 1, wherein the insertion device is provided upstream with two turning devices which can be operated independent from one another.

5. An apparatus according to claim 4, wherein a turning device is arranged for turning a profile section by 180°, whereas the other turning device is arranged for turning profile sections by 90° in a clockwise and counterclockwise direction.

6. An apparatus according to claim 1, wherein the insertion device comprises a means for the lateral displacement of the profile sections.

7. An apparatus according to claim 1, wherein the insertion of the new profiles occurs substantially simultaneously with the roll-out of the previously formed frame.

8. An apparatus according to claim 1, wherein the working plane of the joining device is substantially horizontal.

9. An apparatus according to claim 1, wherein the turning of the profile sections occurs in a plane which is parallel to the working plane of the joining device.

10. An apparatus according to claim 1, wherein several feed devices are provided which each supply one or several joining devices with profile sections.

11. An apparatus for the production of window frames, comprising:
    a plurality of profile sections;
    a conveying device for supplying said profiles sections to an insertion device, said conveying device having a plurality of turning devices for rotating said profile section to various positions;
    said insertion device connected between said conveying device and a joining device, said insertion device having
    a mounting device for mounting corners,
    an application device for applying sealing media or glue to said profile sections, and
    a plurality of insertion components for conveying all of said profile sections to an insertion position on the joining device simultaneously,
    said joining device receiving said profile sections from said insertion device and joining said profile sections together to form a window frame.

12. An apparatus for the production of window frames, comprising:
    a plurality of profile sections;
    a conveying device for supplying said profile sections to an insertion device, said conveying device having a plurality of turning devices for rotating said profile section to various positions;
    said insertion device connected between said conveying device and a joining device, said insertion device having a plurality of insertion components for conveying all of said profile sections to an insertion position on the joining device simultaneously,
    said joining device receiving said profile sections from said insertion device and joining said profile sections together to form a window frame.

13. An apparatus according to claim 12, wherein the joining device is arranged as a welding machine for joining plastic profiles which are cut to mitre.

14. An apparatus according to claim 12, wherein the joining device is arranged as a pressing apparatus for joining aluminum profiles.

15. An apparatus according to claim 12, wherein the insertion device is provided upstream with two turning devices which can be operated independent from one another.

16. An apparatus according to claim 12, wherein a turning device is arranged for turning a profile section by 180°, whereas the other turning device is arranged for turning profile sections by 90° in a clockwise and counterclockwise direction.

17. An apparatus according to claim 12, wherein the insertion device comprises a means for the lateral displacement of the profile sections and inserts the four profile sections simultaneously.

18. An apparatus according to claim 12, wherein the insertion of the new profiles occurs substantially simultaneously with the roll-out of the previously formed frame.

19. An apparatus according to claim 12, wherein the working plane of the joining device is substantially horizontal.

20. An apparatus according to claim 12, wherein the turning of the profile sections occurs in a plane which is parallel to the working plane of the joining device.

21. An apparatus according to claim 12, wherein several feed devices are provided which each supply one or several joining devices with profile sections.

* * * * *